United States Patent
Madison et al.

(10) Patent No.: US 11,418,834 B2
(45) Date of Patent: Aug. 16, 2022

(54) SYNCHRONIZING INTERNET ("OVER THE TOP") VIDEO STREAMS FOR SIMULTANEOUS FEEDBACK

(71) Applicant: Philo, Inc., San Francisco, CA (US)

(72) Inventors: Seth Madison, San Francisco, CA (US); Ginger Wong, Santa Clara, CA (US); Benjamin Paul Clemens, Berkeley, CA (US); Benjamin Avery Chambers, San Francisco, CA (US)

(73) Assignee: Philo, Inc., San Francisco, CA (US)

( * ) Notice: Subject to any disclaimer, the term of this patent is extended or adjusted under 35 U.S.C. 154(b) by 0 days.

(21) Appl. No.: 17/233,175

(22) Filed: Apr. 16, 2021

(65) Prior Publication Data

US 2021/0235149 A1     Jul. 29, 2021

Related U.S. Application Data (62) Division of application No. 16/712,740, filed on Dec. 12, 2019, now Pat. No. 11,006,168, which is a
(Continued)

(51) Int. Cl.
*H04N 21/43* (2011.01)
*H04N 21/472* (2011.01)
(Continued)

(52) U.S. Cl.
CPC ..... *H04N 21/43076* (2020.08); *H04N 21/242* (2013.01); *H04N 21/433* (2013.01); *H04N 21/47217* (2013.01)

(58) Field of Classification Search
CPC .......... H04N 21/23439; H04N 21/242; H04N 21/43076; H04N 21/433; H04N 21/47217;
(Continued)

(56) References Cited

U.S. PATENT DOCUMENTS 8,190,680 B2   5/2012   Spilo et al.
9,131,206 B2   9/2015   Lee et al.
(Continued)

OTHER PUBLICATIONS

Notice of Allowance, U.S. Appl. No. 16/712,740, dated Jan. 13, 2021, 15 pages.
(Continued)

*Primary Examiner* — Francis Geroleo
(74) *Attorney, Agent, or Firm* — Nicholson De Vos Webster & Elliott LLP (57) ABSTRACT

Techniques are described for synchronizing internet ("over the top") video streams for simultaneous playback. In particular, techniques are described to improve the performance and accuracy of stream synchronization among participant media player applications playing a same video content item, for example, as part of a "watch party." The techniques can be further augmented to allow interaction between the users watching the presentation, e.g., by sending messages to other users or by annotating the video presentation with comments, and can be further used to enable "cross device control," a feature that enables multiple users, or a single user with multiple devices, to control a shared video playback session on another device. For example, two users watching a streaming video on a set-top box connected to a TV in their living room could each use an app on their respective smart phones to pause/play/seek the playback session, providing a more collaborative experience.

20 Claims, 4 Drawing Sheets

Related U.S. Application Data division of application No. 16/236,126, filed on Dec. 28, 2018, now Pat. No. 10,536,741.

(60) Provisional application No. 62/748,332, filed on Oct. 19, 2018.

(51) Int. Cl.
*H04N 21/433* (2011.01)
*H04N 21/242* (2011.01)

(58) Field of Classification Search
CPC ........... H04N 21/8455; H04N 21/8456; H04N 21/8547
See application file for complete search history.

(56) References Cited

U.S. PATENT DOCUMENTS

| | | |
|---|---|---|
| 9,654,817 B2 | 5/2017 | Li et al. |
| 9,924,209 B2 | 3/2018 | Chae |
| 2006/0156375 A1* | 7/2006 | Konetski ............ H04N 21/6543 725/135 |
| 2013/0107786 A1 | 5/2013 | Lotfallah et al. |
| 2013/0198298 A1* | 8/2013 | Li ...................... H04N 21/4307 709/206 |
| 2014/0359075 A1 | 12/2014 | Amidei et al. |
| 2014/0359681 A1 | 12/2014 | Amidei |
| 2018/0309827 A1 | 10/2018 | Birrer et al. |
| 2018/0352286 A1* | 12/2018 | Rennison ............ H04N 21/4307 |
| 2018/0359508 A1 | 12/2018 | Lindgren et al. |

OTHER PUBLICATIONS

Notice of Allowance received for U.S. Appl. No. 16/236,126, dated Sep. 10, 2019, 9 pages.

Requirement for Restriction/Election, U.S. Appl. No. 16/712,740, dated Sep. 21, 2020, 5 pages.

\* cited by examiner

SYNCHRONIZING INTERNET ("OVER THE TOP") VIDEO STREAMS FOR SIMULTANEOUS FEEDBACK

CROSS-REFERENCE TO RELATED APPLICATIONS

This application is a divisional of U.S. patent application Ser. No. 16/712,740, filed Dec. 12, 2019, which is a divisional of U.S. patent application Ser. No. 16/236,126, filed Dec. 28, 2018, now U.S. Pat. No. 10,536,741, which claims the benefit of U.S. Provisional Application No. 62/748,332, filed Oct. 19, 2018, all of which are hereby incorporated by reference.

TECHNICAL FIELD

Embodiments relate generally to streaming video and, more specifically, to synchronizing internet ("over the top") video streams for simultaneous playback at multiple client media player applications.

BACKGROUND

Streaming video over data networks (e.g., the internet) has become increasingly popular as the availability of high-bandwidth internet connections has increased. Video streaming refers to a type of video delivery mechanism where the data for the video is continuously delivered to a client device over a data network (e.g., the internet) as the user is viewing the video. Video streaming allows a user to start viewing portions of the video without having to first download the entire video.

Pre-recorded video content or live video content can be streamed over the internet using streaming protocols such as HTTP Live Streaming (HLS) and MPEG Dynamic Adaptive Streaming over HTTP (DASH). Such streaming protocols typically divide video content into a series of video segments and generate a streaming manifest file (also referred to as an index file) that references these video segments. A client device can interpret the streaming manifest file to fetch the video segments and seamlessly assemble the video segments to play the video content. Users sometimes like to watch video content in groups, that is, to watch the same video content at the same time at multiple separate client media player applications. Synchronizing internet ("over the top") video streams for simultaneous playback to allow multiple users to watch the same video content at the same time presents a number of challenges. Some systems for synching streaming video use the Real-time Transport Protocol (RTP) and the Real Time Streaming Protocol (RTSP), potentially with multicast addressing, to send video content out to multiple clients at the same time. This approach can work but presents several challenges for systems that deliver a modern online video service based on HLS and MPEG-DASH.

BRIEF DESCRIPTION OF THE DRAWINGS

Various embodiments in accordance with the present disclosure will be described with reference to the drawings, in which.

DETAILED DESCRIPTION

Various embodiments of methods, apparatus, systems, and non-transitory computer-readable storage media are described for synchronizing internet ("over the top") video streams for simultaneous playback. In particular, techniques are described to improve the performance and accuracy of stream synchronization among a plurality of participant media player applications playing a same video content item, for example, as part of a "watch party."

Most modern video streaming services deliver video to clients using an adaptive bitrate streaming protocol like HTTP Live Streaming (HLS) or Dynamic Adaptive Streaming over HTTP (DASH or MPEG-DASH). According to embodiments described herein, a video streaming service augments an existing HLS and/or DASH media delivery system to provide a coordination mechanism by which a multitude of video player clients can arrange to be watching the same video content at the same time, and with shared controls so it is possible for any of the players to pause or seek (change playback position) in the content playback and have playback paused/seek for all players that are watching.

Embodiments described herein can be used in a number of ways. As one example, the embodiments can be used to implement "watch parties," a feature that allows multiple users of an internet streaming video service (e.g., a virtual multichannel video programming distributor (MVPD)) to watch the same video presentation at the same time, but on different devices in different geographic locations, by synchronizing the playback of online video streaming across all the users' different devices. Embodiments can be further augmented to allow interaction between the users watching the presentation, e.g., by sending messages to other users or by annotating the video presentation with comments.

As another example, embodiments can be used to enable "cross device control," a feature that enables multiple users, or a single user with multiple devices, to control a shared video playback session on another device. For example, two users watching a streaming video on a set-top box connected to a TV in their living room could each use an app on their respective smart phones to pause/play/seek the playback session, providing convenience and a more collaborative experience.

As yet another example, embodiments can be used to enable "second screen" functionality, a feature that enables users to view metadata or interactive content on a secondary device while video plays back on a primary device. For instance, while advertisements play on a user's TV, the system might show the user information about the advertisers on the user's phone or other secondary device.

The use of the synchronization techniques described herein enables the continued use of existing web-based adaptive bitrate streaming (ABR) video systems (e.g., HLS and DASH) by adapting existing ABR video servers and players, saving R&D costs of implementing an RTP or other multicast/broadcast video delivery system. Furthermore, unlike RTP or other multicast/broadcast video delivery systems, the techniques allow content to be cached in a content delivery network (CDN) across multiple sessions, saving on bandwidth costs. Even further, the techniques avoid pitfalls of relying on a moderator client (e.g., issues arising when a moderator client leaves or is on a slow connection) by having the server keep the authoritative state and allowing any participant in the system to modify that state and allowing each player/participant to calculate their correct estimated position using the reference state.

Unlike systems that do not adjust playback rate, the described approaches provide iterative improvement to synchronization quality once playback begins after buffering completes (i.e., the synchronization error is reduced over time). This can result in a dramatic improvement over user-perceived synchronization quality, e.g., two devices with synchronized playback that are placed side-by-side can actually appear to be playing exactly in sync, instead of being off by a user-perceptible small number of seconds. Furthermore, compared to systems that do not compensate for buffering time on seek, this system offers a dramatically better user experience by ensuring that, after buffering, most users in the shared session can still see the content that the seeking user desired to show the group.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (or computing device) stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

As reflected earlier, an electronic device can take a variety of forms, including a client electronic device (also referred to as a client computing device or client device) that implements a media player application that plays back video streamed over a network. Such a client electronic device may be used by a user and have one or more user input mechanisms, such as a keyboard, touchscreen, remote control, etc. Such client electronic devices may come in a variety of sizes, including relatively large (e.g., a smart TV, a set top box without a screen and intended to be connected to a display (such as a TV), or a desktop computer connected to a display) and relatively small (e.g., a mobile device such as a laptop, smart phone, or smart watch with an integrated (and optionally touchscreen) display).

Figure 1:
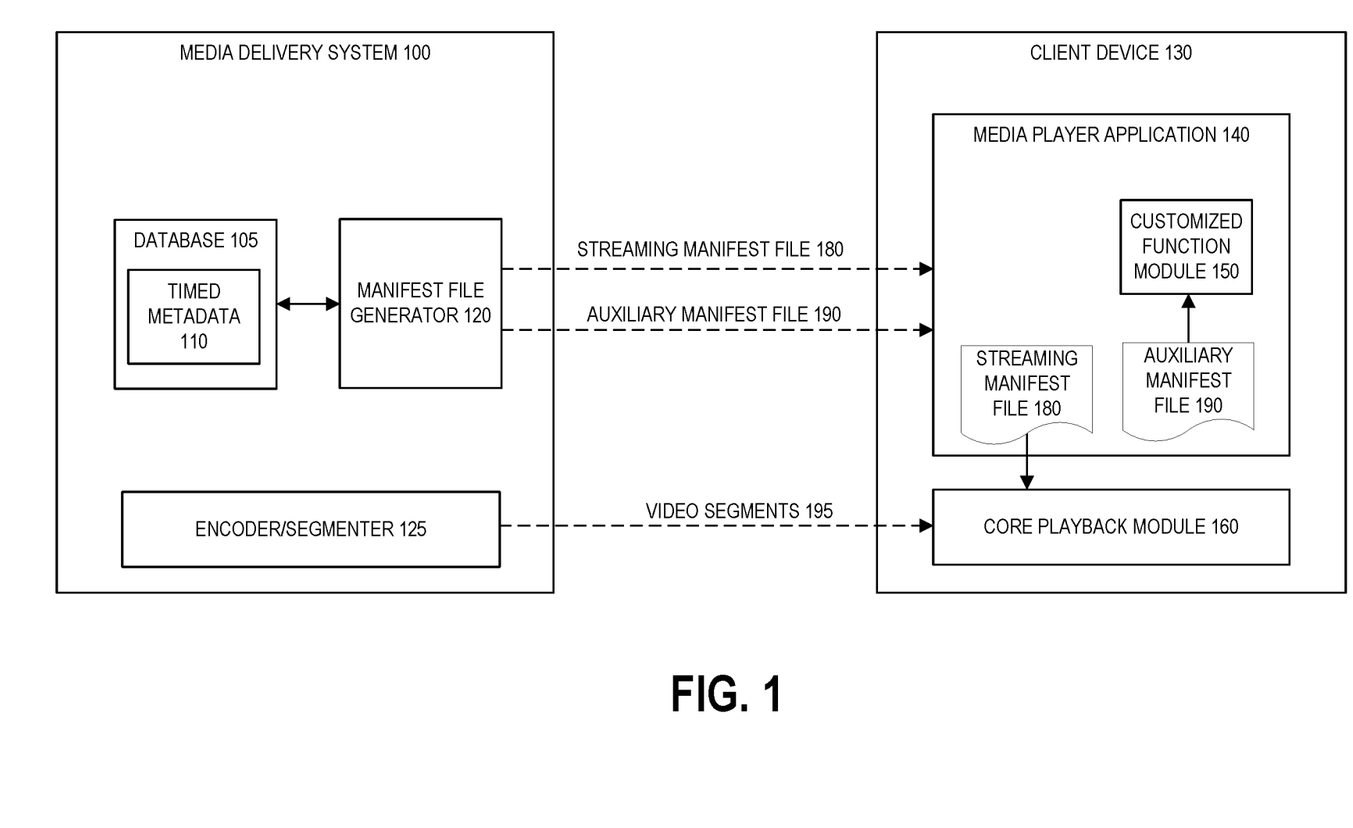
FIG. 1 is a diagram illustrating a video streaming system according to some embodiments.

FIG. 1 is a diagram illustrating a video streaming system, according to some embodiments. The system includes a media delivery system 100 and a client device 130. The media delivery system 100 is a system that enables streaming of live and/or on-demand media content to one or more client devices 130. As shown in the diagram, the media delivery system 100 includes an encoder/segmenter 125 that may digitally encode video content ingested by the media delivery system 100 (e.g., at varying bit rates). The encoder/segmenter 125 may then segment the encoded video content into a series of video segments and make the video segments accessible to client devices 130 (e.g., by sending the video segments 195 to the client device 130 or storing the video segments 195 in a content delivery network (CDN) accessible to the client device 130).

As shown in the diagram, the media delivery system 100 includes a manifest file generator 120 that is configured to generate a streaming manifest file 180 and one or more auxiliary manifest files 190 for consumption by the client device 130. The streaming manifest file 180 is a manifest file that references video segments 195 of a video content, which can be interpreted by a client device 130 to play the video content. For example, the streaming manifest file 180 could be an HTTP Live Streaming (HLS) manifest file or a MPEG Dynamic Adaptive Streaming over HTTP (DASH) manifest file. An auxiliary manifest file 190 is a manifest file that includes timed metadata associated with video content. For example, an auxiliary manifest file 190 could include timed metadata such as thumbnail information or ad location information. The streaming manifest file 180 and one or more auxiliary manifest files 190 refer to the same timeline (they refer to the same timing representation—this could be, for example, a presentation timeline where time t=0 is the location corresponding to the beginning of the navigation bar). The manifest file generator 120 may generate the one or more auxiliary manifest files 190 based, at least in part, on timed metadata 110 stored in the database 105 (e.g., the timed metadata 110 may be stored in the database in a generic format that is not specific to a particular file format and the manifest file generator may generate an auxiliary manifest file in a given format based on querying the timed metadata 110 from the database 105). In one embodiment, the auxiliary manifest file 190 encodes timed metadata in a relatively simple serialization format such as JSON format or other well-known serialization format so that the timed metadata can be easily parsed from the auxiliary manifest file 190 and to make it easier to provide cross-platform support. In one embodiment, some timed metadata can be included in the HTTP headers of the streaming manifest file. As will be described in additional detail below, the one or more auxiliary manifest files 190 (and more specifically, the timed metadata stored therein) can be used by a client device 130 to provide customized functionality that augments video playback (e.g., providing thumbnails for navigating a video and/or for identifying ad locations on a navigation bar).

As shown in the diagram, the client device 130 includes a media player application 140 and a core playback module 160. The media player application 140 may send a request to the server side (e.g., the media delivery system 100, a web server, a CDN, etc.) for a streaming manifest file 180. In response to the request, the server side may provide the media player application 140 with a streaming manifest file 180. In addition, the server side may also provide the media player application 140 with an auxiliary manifest file 190 (this could be responsive to the same request or a separate request, e.g., that is sent in parallel with the request for the streaming manifest file 180, where the streaming manifest file 180 and the auxiliary manifest file 190 could come from the same server or a different server). While the diagram shows the client device 130 receiving the streaming manifest file 180 and the auxiliary manifest file 190 directly from the media delivery system 100, it should be understood that the client device 130 can receive these manifest files in a different way (e.g., from a web server or a CDN). In one embodiment, the media player application 140 may pass the streaming manifest file 180 to the core playback module 160 for video playback and pass the auxiliary manifest file 190 to a customized function module 150 to provide customized functionality using the timed metadata in the auxiliary manifest file 190. The core playback module 160 interprets the streaming manifest file 180 and plays video content according to the streaming manifest file 180. This may involve fetching, decoding, and playing video segments 195 referenced in the streaming manifest file 180. While the diagram shows the client device 130 receiving the video segments 195 directly from the media delivery system 100, it should be understood that the client device 130 can receive these manifest files in a different way (e.g., from a web server or a CDN). In one embodiment, the core playback module 160 may be compatible with HLS and/or DASH streaming protocols. The customized function module 150 provides custom functionality (e.g., that replaces or augments the functionality provided by the core playback module) using the timed metadata in the auxiliary manifest file 190. For example, the customized function module 150 may augment video playback with its own implementation of: 1) video navigation using thumbnails and/or 2) identifying ad locations. For example, the customized function module 150 may use thumbnail information included in an auxiliary manifest file 190 to display a thumbnail on a display responsive to user input (e.g., user hovering their cursor over the navigation bar or performing a swiping gesture on a touch sensitive screen) to allow the user to navigate the video content. As another example, the customized function module 150 may use ad location information included in an auxiliary manifest file 190 to display ad locations on a navigation bar (e.g., by highlighting portions of the navigation bar that correspond to ads). In some embodiments, the media player application 140 prevents certain operations (e.g., display of a navigation bar or seeking to a different location in the video content) until certain criteria is met (e.g., receipt of one or more of the auxiliary manifest files 190, and in some cases retrieval of some or all of the content identified by the timed metadata in the auxiliary manifest file 190 (e.g., retrieval of at least some or all of the thumbnails identified by the timed metadata in the auxiliary manifest file 190). In the case of video content currently being broadcast (e.g., live TV), the media player application 140 may repeatedly request the streaming manifest file 180 as is known in the art, because additional data is being added to the streaming manifest file 180 as new video segments become available. In some embodiments, the same is done for at least one auxiliary manifest file 190.

Although the client device 130 is shown as receiving a single auxiliary manifest file 190, it should be understood that the client device 130 can receive more than one auxiliary manifest file 190 (e.g., each having different types of timed metadata). Also, although the client device 130 is shown as having a single customized function module 150, it should be understood that the client device 130 can include more than one customized function module 150 (e.g., one for each type of auxiliary manifest file it may receive) to provide customized functionality utilizing different types of timed metadata.

In some cases, the core playback module 160 is developed/controlled by a first entity (e.g., the entity that develops/controls the client device platform and/or the entity that develops/controls the streaming protocol—as an example, Apple® and Roku® control the core playback modules found in the operating systems of their respective client device platforms such as Apple TV®/iPad®/iPhone®/Macintosh® and various Roku® devices). In such cases, other entities developing media player applications 140 for a platform may effectively have to use the core playback module 160 installed in the client device 130 by the first entity (because the first entity may not allow other entities such as third-party developers to modify/configure the core playback module 160). Thus, even if a streaming manifest file 180 includes timed metadata, the other entities may have to rely on the functionality provided by the first entity's core playback module 160 to utilize that timed metadata. One way to circumvent this problem is for the other entities to develop media player applications 140 that extract the timed metadata from the streaming manifest file 180 before the streaming manifest file 180 is passed on to a core playback module 160. However, streaming manifest files 180 are typically very complex, and thus trying to extract timed metadata from a streaming manifest file 180 may be computationally expensive, which can waste precious computing resources of the client device 130. Having a separate auxiliary manifest file 190 that includes timed metadata allows the other entities to develop media player applications 140 that utilize timed metadata to provide custom functionality, without having to incur the expense of extracting the timed metadata from a streaming manifest file 180.

Different embodiments may utilize auxiliary manifest files 190 for different purposes. For example, an auxiliary manifest file 190 may be used to identify the thumbnails used for navigating within a video content described by a streaming manifest file 180. While it is possible to include timed metadata within the streaming manifest file 180 itself to identify the thumbnails, this has the disadvantage that: 1) the core playback module 160 for one or more platforms may not support that aspect of the streaming manifest file 180; 2) the core playback module 160 for one or more platforms may not support using the thumbnails in a manner that is considered to provide the best user experience; and 3) the core playback module 160 for different platforms may implement the user interface for video navigation differently. Having a separate auxiliary manifest file 190 with timed metadata for thumbnails allows an application developer to develop their own code for performing video navigation operations that replaces or augments the functionality provided by the underlying playback module 160. As such, where such an auxiliary manifest file 190 is provided, the application developer can implement video navigation with thumbnails in a consistent manner across multiple platforms regardless of whether the timed metadata for thumbnails is present in the streaming manifest file 180, regardless of whether the core playback modules 160 on different platforms support this aspect of the streaming manifest file 190, and/or regardless of whether the core playback modules 160 on different platforms implement video navigation with thumbnails differently.

By way of another example, in some embodiments, an auxiliary manifest file 190 may be used to identify the location of advertisements (ads) in a video content described by a streaming manifest file 180. While it is possible to include timed metadata within the streaming manifest file 180 to identify ad locations, this has the disadvantage that: 1) the core playback module 160 for one or more platforms may not support that aspect of the streaming manifest file 180; 2) the core playback module 160 for one or more platforms may not support using the ad location information in a manner that is considered to provide the best user experience; and 3) the core playback module 160 for different platforms may implement the user interface that identifies the ad locations differently. Having a separate auxiliary manifest file 190 with timed metadata for identifying ad locations allows an application developer to develop their own code for displaying ad locations (e.g., on a navigation bar to allow a user to identify where the ads are located) that replaces or augments the functionality provided by the underlying playback module 160. As such, where such an auxiliary manifest file 190 is provided, the application developer can implement functionality to identify ad locations in a consistent manner across multiple platforms regardless of whether the timed metadata for identifying ad locations is present in the streaming manifest file 180, regardless of whether the core playback modules 160 on different platforms support this aspect of the streaming manifest file 180, and/or regardless of whether the core playback modules 160 on different platforms implement identifying ad locations differently.

While the examples of thumbnails and ad locations are discussed here, it should be understood that different embodiments may support other types of timed metadata and associated operations/functionality that utilize the timed metadata.

In some embodiments, multiple auxiliary manifest files 190 are provided, where each auxiliary manifest file 190 is for enabling a different feature/functionality. For example, assume that a first and second auxiliary manifest file 190 is provided for a first and second feature, respectively. Also, assume that the core playback module 160 on a first platform supports the first feature (based on using timed metadata included in the streaming manifest file 180), but not the second feature. In contrast, assume the core playback module 160 on a second platform does not support the first or second features. In this case, the media player application 140 developed for the first platform may: 1) request the streaming manifest file 180 and provide it to the first platform's core playback module 160 for playback of the video content and provision of the first feature; and 2) request just the second auxiliary manifest file 190 for use by the media player application 140 (more specifically, a customized function module 150 of the media player application 140) to provide the second feature. In contrast, the media player application 140 developed for the second platform may: 1) request the streaming manifest file 180 and provide it to the second platform's core playback module 160 for playback of the video content; and 2) request both the first and second auxiliary manifest files 190 for use by the media player application 140 (more specifically, a first and second customized function module 150 of the media player application 140, respectively) to provide the first and second feature. Thus, the separation of auxiliary manifest files 190 for different features/functionality allows for the media player applications 140 developed for different platforms to request and process only the auxiliary manifest files 190 it needs. While in some embodiments there are separate auxiliary manifest files 190 corresponding to different features/functionality, alternative embodiments may implement the auxiliary manifest files 190 differently (e.g., have a single auxiliary manifest file 190 that includes timed metadata for all of the features/functionality that the media player applications 140 on different platforms may implement (even though the media player applications 140 for every one of these platforms may not necessarily implement all of the features) or have multiple auxiliary manifest files 190 that include timed metadata for a given set of features depending on what features the media player applications 140 on different platforms provide).

Figure 2:
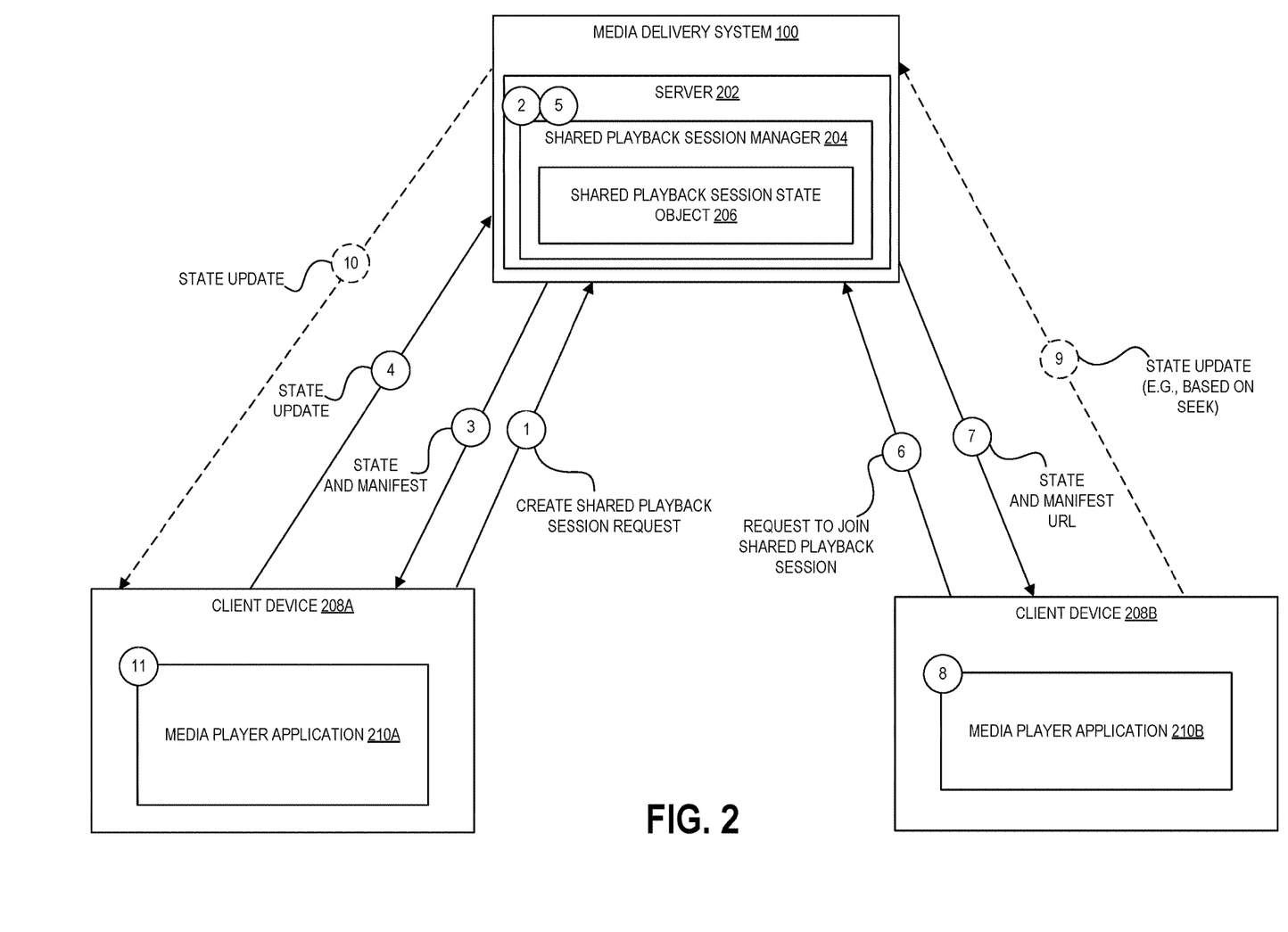
FIG. 2 is a diagram illustrating a video streaming system that enables synchronizing video streams for simultaneous playback at multiple client media player applications according to some embodiments.

FIG. 2 is a diagram illustrating a video streaming system that enables shared playback sessions according to some embodiments. In one embodiment, the process is performed by an electronic device or a set of electronic devices that implement a media delivery system 100. The process can be implemented using software, hardware, firmware, or any combination thereof. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

At a high level, the video streaming system includes: (a) a set of video segment files hosted on a server and/or CDN (for example, a server and/or CDN of the media delivery system 100); (b) a server that can generate a "manifest" file, which is a playlist that describes the order in which those video segment files are to be played by a client, and which thus defines a video presentation and a shared timeline; (c) one or more video player clients (e.g., media player application 210A and 210B) which can fetch the manifest file and play the video files in order; (d) a server component (e.g., a shared playback session manager 204 of the server 202) that tracks a shared "playback session" (e.g., represented by a shared playback session state object 206) which a multitude of media player applications can access, and which is used to inform all the media player applications of what the current state (e.g., "playing" or "paused") and position with a timestamp of where the playback session currently is (e.g. "currently at position 11:23 in the presentation as of 2018-10-17 01:35:12 UTC"); (e) modifications to the media player applications that allow them to periodically obtain the "playback session" state from the server, estimate a target position to sync playback to and adjust their own playback positions to match it, and potentially send a message to modify the state on the server if a user using a media player application pauses playback or "seeks" (changes the playback position within the presentation); (f) further modifications to the media player application client code to utilize variable playback speed to iteratively reduce synchronization error (difference between desired and actual playback synchronization after buffering completes and playback begins); (g) further modification to the client code so that on seek (modifying the shared playback location), corrections are made to compensate for buffering time such that most of the synchronized players are able to see the desired content.

In an embodiment, the shared playback state consists of a data structure (e.g., a shared playback session state object 206) maintained by a server that is accessible to all client media player applications participating in the system. For each shared playback session, the server tracks the following state: (a) a "play state" indicating the current playback state of the shared session (e.g., "playing" or "paused"); (b) a "reference position" indicating the last measured playback position within the presentation, e.g., measured in seconds from the beginning of the presentation; (c) a "reference time" indicating a Coordinated Universal Time (UTC) timestamp corresponding to the time when reference position was measured.

In an embodiment, each client media player application in the system is expected to have a clock with the correct UTC time as coordinated by Network Time Protocol (NTP) (or an equivalent clock synchronization protocol). To handle cases where a client media player application's clock is not synchronized, the server component includes its own current UTC timestamp with each update message that it sends to each client media player application. If a client media player application detects that the difference between the server's UTC timestamp and the client's current UTC exceeds some threshold (e.g. a few seconds), the client media player application can reasonably conclude that its own clock is out of sync. The player could then do one or more of the following: (a) calculate an estimated clock skew offset by subtracting the server's UTC timestamp from its own and adjust the reference position by that amount (this would get the client reasonably close to the correct target playback position, although it may still be inaccurate by some amount due to network latency/delay); or (b) show a warning message to the user suggesting that the user synchronize their clock (e.g., by enabling NTP).

In an embodiment, each client media player application participating in the shared playback session is in communication with a shared server 202, for example, via a pub/sub communication mechanism that allows asynchronous messages to be passed in both directions (e.g., from any client to the server or from the server to any or all clients). Although the example shown in FIG. 2 shows only two client devices 208A and 208B and respective media player applications 210A and 210B, in practical embodiments, a shared playback session can involve any number of separate client devices and media player applications.

As indicated above, it is sometimes desirable for users to create a shared playback session. In an embodiment, at the circle labeled "1" in FIG. 2, a media player application (e.g., media player application 210A of client device 208A) initiates a shared playback session by generating and sending a create shared playback session request (e.g., a CREATE SESSION message) to a server (e.g., a server 202 of the media delivery system 100 that managers shared playback sessions). The shared playback session creation request identifies (a) which video presentation is to be watched and (b) the position within that presentation to start playback (e.g., starting at 120 seconds from the beginning of the presentation). The shared playback session creation request may be generated, for example, in response to user input received by the media player application 210A requesting creation of the shared playback session.

In an embodiment, at circle "2," the server 202 processes the request by (a) creating a standard playback session (e.g., using an HLS or DASH manifest) and (b) creating a new shared playback session state object 206 with the fields including a "play state," a "reference position," and a "reference time." In one embodiment, the server 202 initially sets a value for the "play state" field to "initializing." In an embodiment, the server 202 also creates a unique identifier of the shared playback session and stores the unique identifier in association with the shared playback session state object 206.

In an embodiment, at circle "3," the server 202 sends to the media player application 210A a response including (a) the unique identifier of playback session state object 206 generated at circle "2" and (b) the manifest file for the video session. In an embodiment, the media player application 210A begins video playback in response to receiving the manifest file, as described in more detail hereinafter.

In an embodiment, at circle "4," once the initiating media player application 210A is able to start playback, the media player application 210A sends a shared playback session state update request (e.g., an UPDATE SESSION message) to the server 202. The state update request includes the media player application's 210A current position in the video presentation and a current UTC time at which the position was measured. In some examples, the current UTC time reported by the media player application 210A (and the UTC times reported by one or more of the other client devices participating in the shared playback session) may have a skew offset applied, as applied above.

In an embodiment, at circle "5," the server 202 receives the state update request from the media player application 210A and sets the value of the "play state" field of the corresponding shared playback session state object 206 to "playing" and further sets the "reference time" and "reference position" fields according to the values specified in the state update request.

In an embodiment, at circle "6," another media player application (e.g., media player application 210B) sends a request to join the shared playback session (e.g., by sending a JOIN_SESSION message) to the server 202, where the join request includes the unique identifier of the shared playback session generated by the server 202 at circle "2." The media player application 210B (and any number of other media player applications) can obtain the unique identifier of the shared playback session, for example, by obtaining a user-shared link containing the identifier from a friend, or a UI may provide a button to other users showing the availability of that shared playback session to join, and the like.

In an embodiment, at circle "7," in response to receiving the request from the media player application 210B to join the shared playback session, the server 202 returns (a) information representing the current shared playback session object (including the current values for the "play state," "reference position," and "reference time" fields) and (b) the URL of the shared manifest for the video content being shared.

In an embodiment, at circle "8," the media player application 210B begins playback of the video presentation in response to receiving the information from the server 202. In order to synchronize playback of the video presentation at the media player application 210B (and at any additional players), care is taken since there is buffering delay while each player downloads the video segment files used to begin playback. In an embodiment, each media player application joining a shared playback session uses the algorithm described below to join the shared session in a synchronized way.

In an embodiment, a media player application (e.g., media player application 210B) used to join a shared playback session defines a "seek delay" variable that indicates a typical buffering delay time (e.g., the time required for a typical media player application on a typical internet connection to download enough video segment files to begin playback). This "seek delay" variable can be calculated using inputs such as, for example, network conditions, input from the player (e.g., indicating how much data is already buffered and how much data needs to be buffered to start playback), CPU load, and historical data from previous seeks/buffers. In one embodiment, the "seek delay" is calculated as an exponential weighted moving average of historical buffering delay times recorded by the player device. In another embodiment, the "seek delay" is calculated using the following formulas: data_to_download= seconds_of_unbuffered_video*currently_selected_bitrate; seek_delay=data_to_download/estimated_download_rate; where the estimated_download_rate is calculated by observing network conditions during previous seeks and video startups; and where a default value is used if this information is not available.

In an embodiment, using the current value for "reference position" and "reference time" received from the server 202 at circle "7," the media player application 210B calculates a "seek position" as follows, where now( ) is the current UTC time of the media player application 210B and seek_delay is calculated as described above: "seek position"="reference position"+(now( )–"reference time")+seek_delay.

In an embodiment, once the "seek position" is calculated as above, the media player application 210B seeks to the calculated "seek position" to begin playback. The media player application 210A buffers the video presentation (downloads the necessary video segment files required to begin playback at the calculated "seek position" in the presentation). In an embodiment, when buffering is complete, the media player application 210B calculates the "target position" at the current UTC time based on the following formula: "target position"="reference position"+(now( )–"reference time").

If the calculated position is within a defined PLAYBACK_THRESHOLD (a defined maximum allowed time difference before the application allows beginning playback), the media player application starts playing the content. If the calculated position is not within a defined PLAYBACK_THRESHOLD, the media player application 210B selects a new "seek delay" and a new "seek position" (e.g., it may set "seek delay"="seek delay"+(now( )–"target time") and again calculates the "seek position" as described above, it may recalculate it as described above but with newly learned data (e.g., an updated estimated download rate)); in some embodiments, this is done a threshold number of times, and if it fails then it notifies the user and plays back the video separate from the watch party (unsynchronized).

If the media player application 210B is not within a defined SYNC_THRESHOLD (desired time difference from desired position and actual position), in an embodiment, the media player application 210B adjusts the playback rate up or down slightly so that the player gradually either catches up or slows down to hit the desired target position. Once the media player application 210B is back within SYNC_THRESHOLD, the application can set the playback rate to normal. The adjustment of the playback rate can be imperceptible to the user so that the user does not notice the adjustments. In one embodiment, if the media player application 210B is ahead of the target, the application can slow down the rate to roughly 80% of normal playback speed; if the media player application 210B is behind the target, the application can speed up playback by roughly 130% of normal. Users typically notice slower content much more than faster content, thus the discrepancy between the faster rate and the slower rate. Note that usually playback rate is controllable via player code (notably on w3c MSE based players) to allow users to speed up or slow down playback. Here, these playback rate controls can be used to achieve better synchronization. In pseudo-code, the playback speed adjustment might look like this: position_error= target_position−current_position

```
if (position_error>SYNC_THRESHOLD)//player is too far
    behind, go faster to catch up playback_rate=1.3
else if (position_error<-SYNC_THRESHOLD)//player is
    too far ahead, slow down playback_rate=0.8
else//player is within SYNC_THRESHOLD, use normal
    playback speed playback_rate=1.0
```

If a user of one of the participating media player applications (e.g., media player application 210B) in the synchronized session wishes to seek to a different position in the content (e.g., changing the playback position by fast forwarding 60 seconds in the content), the media player application can send a message to the server to mutate the "reference position" and "timestamp" values for the corresponding shared playback session object 206. For example, at circle "9" in FIG. 2, if a user of the media player application 210B seeks to a different position in the content or otherwise causes a playback position change, the media player application 210B sends a state update request to indicate the change. For example, the state update request can indicate a playback state (e.g., "playing," "paused," etc.), a new position in the content, and a reference time at which the new position was measured. In some embodiments, the ability to modify the playback of the content can be limited to a subset of all the media player applications participating in the shared playback session, for example, to avoid situations in which media player applications are providing conflicting updates. In some examples, the set of participants that can modify the playback can be selected by the user initiating the shared playback session, limited to a total number of player applications, or based on any other types of access controls.

In one embodiment, the server 202 can receive the state update request generated in circle "9," update its shared playback session state object 206, and disseminate this new information to any other clients that are part of the shared playback session. However, if the other media player applications in the system used the algorithm described above (for example, adding a "seek delay" to calculate a target playback start), these media player applications may miss an amount of content at the new seek location equal to their "seek delay." In other words, if a user of one media player application seeks to a funny joke in a video, the other media player applications involved in the shared playback session may "miss the joke" because actual playback begins "seek delay" seconds after the joke.

In one embodiment, to mitigate the chances of other media player applications in a shared playback session missing a portion of content because of the calculated "seek delay," when a media player application causes a seek, the media player application mutating "target position" instead sets the "reference position"="desired reference position"–"seek delay." In this manner, the media player application causing the seek will "see the joke," as will any other synchronized media player application whose "seek delay" is <=the seek delay of the user who did the seek.

Figure 3:
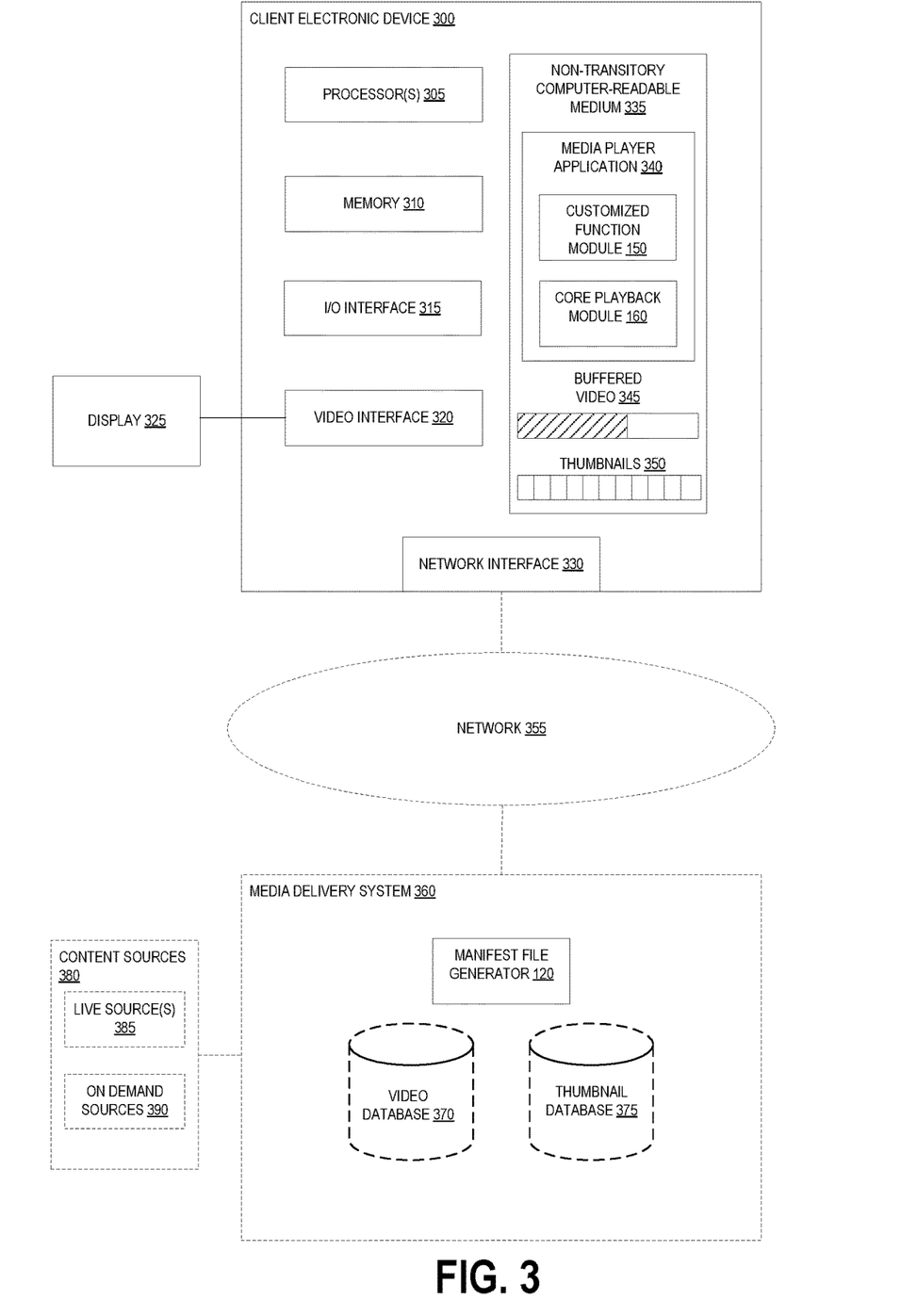
FIG. 3 illustrates a video streaming system according to some embodiments.

FIG. 3 is a block diagram illustrating a video streaming system, according to some embodiments. The system includes a client electronic device 300 that is communicatively coupled to a media delivery system 360 over a network 355. In an embodiment, a client electronic device 300 is an electronic device that is able to request video content (also referred to simply as "video") from the media delivery system 360 and to play video content served by the media delivery system 360. The media delivery system 360 is a remote service configured to receive requests for video content from the client electronic device 300 and to serve the requested video content to the client electronic device 300.

Although one client electronic device 300 is shown in FIG. 3, the system can include more than one client electronic device 300 and typically may include many separate client electronic devices 300. Furthermore, the media delivery system 360 can include additional components such as processors, storage servers, authentication servers, firewalls, and load balancers, which are not shown here for sake of clarity.

As shown in the diagram, the client electronic device 300 includes one or more processors 305, a memory 310, an input/output (I/O) interface 315, a video interface 320, a network interface 315, and a non-transitory computer-readable medium 335. The processors 305 may be, for example, general purpose microprocessors. The memory 310 may be a Random Access Memory (RAM) or other dynamic or volatile storage device for storing data and instructions to be executed by the processors 305. Memory 310 may also be used for storing temporary variables or other intermediate information during execution of instructions to be executed by the processors 305. Such instructions, when stored in the non-transitory computer-readable medium 335, render client electronic device 300 to be a special-purpose machine that is customized to perform the operations specified by the instructions.

In one embodiment, the non-transitory computer-readable medium 335 includes a core playback module 160 and a customized function module 150 that are included as part of a media player application 140. Media player application 140 may be an application that allows users to browse and play video accessible from a media delivery system 360. The core playback module 160 and the customized function module 350 may include code/instructions, that when executed by the processors 305, cause the client electronic device 300 to perform operations of one or more embodiments described herein.

The I/O interface 315 is configured to receive user input from a user via an input device. The input device may be any type of device that can receive user input such as a keyboard, a mouse, a touchscreen panel affixed to a display, a trackpad, or a remote control. Other examples of suitable input devices include cameras, microphones, accelerometers, motion detectors, brain-machine interfaces, and/or other sensors.

The video interface 320 is communicatively coupled to a display 325 and is configured to output video content to the display 325. The display 325 may be any type of device that can display video content, the possible types of displays including, but not limited to, a television, a computer monitor, or a touchscreen display. While the display 325 is shown as being separate from the client electronic device 300, in some embodiments, the display 325 is integrated with the client electronic device 300.

The client electronic device 300 may be any type of device that can request and receive video content and can output video content to a display 325. For example, a client electronic device 300 can comprise a mobile device, a tablet computer, a desktop computer, a set-top box (STB), a smart TV, a video game console, a digital media player, a digital versatile disk (DVD) player, or a Blu-Ray player.

The data network 355 can be any type of network capable of transporting data from one device to another device (for example, from a client electronic device 300 to media delivery system 360 and from media delivery system 360 to one or more client electronic devices 300). For example, the data network 355 can include any combination of the internet, a Wide Area Network (WAN), a Local Area Network (LAN), a cellular communications network, a telephone network, a terrestrial analog or digital signal system, a cable system, and a satellite communications system.

The media delivery system 360 includes a video database 370 and a thumbnail database 375. In an embodiment, the media delivery system 360 can be implemented across any number of hardware devices and platforms in a distributed manner. In an embodiment, the media delivery system 360 ingests video content from content sources 380, such as one or more live content source(s) 385 (for example, live linear programming from one or more broadcast sources), one or more on demand content sources 390 (for example, one or more video-on-demand (VOD) content services), or both, and stores some or all of the ingested video content in the video database 370 to be served to client electronic devices 300. The media delivery system 360 may store thumbnails for some or all of the ingested video content in the thumbnail database 375. For example, video content items (for example, television episodes, movies, VOD programs, and so forth) stored in the video database 370 may be associated with corresponding sets of thumbnails. In an embodiment, the set of thumbnails associated with a video content item can include thumbnails where each thumbnail is associated with a particular time position in the video content. For example, the set of thumbnails for a particular video content item might include a thumbnail for every five (5) second increment in the video content. More granular or less granular thumbnail increments are also possible. In one embodiment, the media delivery system 360 includes a manifest file generator 120 that can generate streaming manifest files 180 and auxiliary manifest files 190, as described herein. The manifest file generator component 120 may be implanted using software, hardware, firmware, or any combination thereof.

In an embodiment, certain components of the media delivery system 360 can be implemented in full or in part using "cloud"-based components that are coupled to the systems by one or more networks, such as the internet. The cloud-based components may expose interfaces by which they provide processing, storage, software, and/or other resources to other components of the systems. In an embodiment, the cloud-based components may be implemented by third-party entities on behalf of another entity for whom the components are deployed. In other embodiments, the described systems may be implemented entirely by computer systems owned and operated by a single entity.

During operation of the system, a client electronic device 300 may generate and transmit one or more requests to the media delivery system 360 to play or otherwise access particular video content items. In response to receiving such requests, the media delivery system 360 may serve the requested video content items to the client electronic devices 300. This may involve transmitting video content stored in the video database 370, as well as thumbnails associated with the video content stored in the thumbnail database 375, to the client electronic devices 300 over the network 355. The client electronic devices 300 may buffer a portion of the received video content (e.g., video 610) in the non-transitory machine-readable medium 335 and output the buffered video content to the display 325. In one embodiment, as shown in the diagram, the client device 300 buffers a threshold amount of video content following (and preceding) the user's current viewing position 352 in the video 610 (e.g., buffered video 353). The client electronic device 300 may also store some or all of the thumbnails 350 for the video 610 in the non-transitory machine-readable medium 335. Each thumbnail is associated with a time position in the video 610 (e.g., as indicated by the arrows extending from each of the thumbnails 350 to an associated time position in the video 610). The client device 300 may use the thumbnails 350 to generate and output (to the display 325) a GUI that allows a user to navigate a video.

Figure 4:
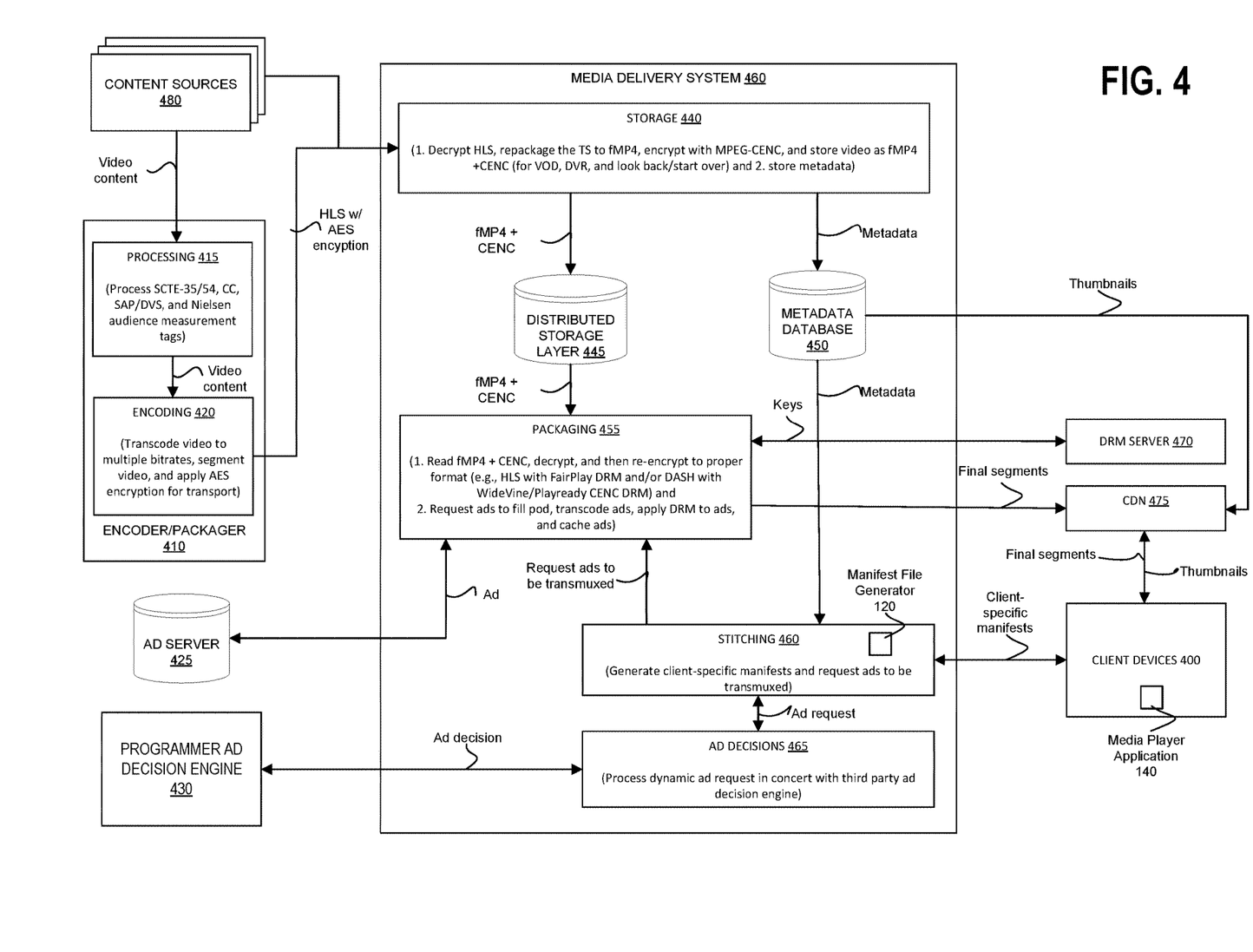
FIG. 4 illustrates a video streaming system architecture according to some embodiments.

FIG. 4 is a diagram illustrating a video streaming system architecture, according to some embodiments. In an embodiment, the system of FIG. 4 includes content sources 480, an encoder/packager 410, a media delivery system 460, an ad server 425, a programmer ad decision engine 430, a Digital Rights Management (DRM) server 470, a Content Distribution Network (CDN) 475, and client electronic devices 400. The encoder/packager 410 includes a processing component 415 and an encoding component 420. The media delivery system 460 includes a storage component 440, a packaging component 455, a stitching component 460, and an ad decisions component 465.

The content sources 480 provide video content that is to be consumed by users. The video content can include live content, VOD content, and/or any other type of video content.

The encoder/packager 410 ingests video content from the content sources 480. For example, the encoder/packager 410 can ingest live video content picked up from a signal of a live linear cable network—national or local, where appropriate and agreed upon. As another example, the encoder/packager 410 can ingest VOD content directly from the programmer itself or via a content aggregation partner. In one embodiment, the encoder/packager 410 may ingest video content via satellite or terrestrial means. In one embodiment, the encoder/packager 410 receives Society of Cable and Telecommunications Engineers 35 2013 (SCTE-35) markers in a data Program Information Description (PID) along with the video content. SCTE-35 can be used to signal ad insertion opportunities in the transport stream, which can be used for Dynamic Ad Insertion (DAI). In one embodiment, the encoder/packager 410 receives Nielsen audience measurement tags in a data PID, or embedded in the audio stream. The Nielsen audience measurement tags can be used to measure audience size and demographic information. The processing component 415 of the encoder/packager 410 processes the SCTE-35 markers and the Nielsen audience measurement tags as well as any Closed Captioning (CC) and Second Audio Programming (SAP)/Descriptive Video Service (DVS) information.

In one embodiment, the encoding component 420 of the encoder/packager 410 transcodes the video content into multiple bitrates (for example, into several Adaptive Bitrate (ABR) profiles) and places key frames at ad boundaries as informed by the SCTE-35 data. The packager segments the content according to the keyframes placed by the transcoder and encrypts the content for transport (for example, using Advanced Encryption Standard (AES) encryption). In one embodiment, the video is packaged using the Hypertext Transfer Protocol (HTTP) Live Streaming (HLS) protocol with AES encryption and the HLS-encoded video is provided to the media delivery system 460 (for example, over a private network connection).

In one embodiment, the storage component 440 of the media delivery system 460 stores the encoded and encrypted video content, decrypts the video content, repackages the video content to an intermediate format (for example, using fragmented MPEG-4 (fMP4) or any other video streaming format), encrypts the repackaged video (for example, using MPEG Common Encryption (MPEG-CENC)), and stores the encrypted video segments in a distributed storage layer 445, which serves as the origin for the content distribution network (CDN). In general, the storage component 440 can store the video in any intermediate file format suitable for transfer to a CDN, directly to client devices, or both. In one embodiment, to provide low-latency access to live content, the media delivery system can act as a fall back origin for the CDN in case the video segments are requested before they have been permanently stored in the distributed storage layer 445. When a client electronic device 400 requests a video, the video segments can be repackaged on the fly (just-in-time repackaging) into the appropriate output format. In other embodiments, the video content ingested from content sources 480 can be stored in its original format (e.g., HLS) without conversion.

In one embodiment, the distributed storage layer 445 is provided using a cloud-based storage service. Also, the storage component 440 may store relevant metadata for the video (for example, timestamps and SCTE-35 markers) in a metadata database 450 (for example, a relational database or other data storage application). In one embodiment, the metadata includes some or all of: information related to ad positions, ad insertion information, thumbnail image files (for example, stored in JPG or PNG format), and information related to the thumbnails such as their associated time positions in the video. In an embodiment, metadata database corresponds to database 105 and stores timed metadata. For live video, the metadata may include GIF preview animations showing the most recent video (the most recent 15 seconds, for example). In one embodiment, the thumbnails are cached in one or more Content Distribution Networks (CDNs) to be served to clients.

In one embodiment, the media delivery system 460 ingests mezzanine VOD assets from a programmer via a secure Internet Protocol (IP) connection. The VOD assets may then be processed using a job-based workflow. In one embodiment, the metadata for the VOD assets are ingested and stored in the metadata database 450 while the mezzanine files are transcoded to fMP4 with CENC and stored in the distributed storage layer 445.

The packaging component 455 of the media delivery system 460 reads the encrypted video segments, decrypts the segments, optionally transmuxes the segments, and then re-encrypts the segments to the proper format. In one embodiment, the re-encrypted formats include HLS with FairPlay Digital Rights Management (DRM), Dynamic Adaptive Streaming over HTTP (DASH) with WideVine/PlayReady CENC DRM, or both. The packaging component 455 passes through any ID3 tags for Nielsen measurements and communicates with the DRM server 470 (which manages content license keys) to ensure that all content is encrypted with up-to-date keys. The final video segments are cached in one or more CDNs 475 to be served to client electronic devices 400.

The stitching component 460 of the media delivery system 460 generates client-specific manifests on the fly (just-in-time manifest creation to allow for fine-grained control over the video stream and the end-user experience). The stitching component 460 can generate manifests for HLS, DASH, or any manifest format suitable for the client electronic devices 400. The manifests may be generated based on the metadata stored in the metadata database 450. In one embodiment, the stitching component 460 includes a manifest file generator 120, which generates streaming manifest files 180 and auxiliary manifest files 190, as described herein. In other embodiments, the manifest file generator 120 may be separate from the stitching component 460. Also, the stitching component 460 may drive dynamic ad insertion (DAI) using a programmer ad decision engine 430. For example, the stitching component 460 may send a request to the ad decisions component 465 for ads to be transmuxed into a video. The ad decisions component 465 processes the dynamic ad request in concert with a third-party ad decision engine such as the programmer ad decision engine 430 and provides an indication of the ads to be transmuxed into the video. The stitching component 460 may then make a request to the packaging component 455 to transmux the ads. When a client ad pod is upcoming, the packaging component 455 of the media delivery system 460 may request the ads from the ad server 425 to fill the ad pod, transcode the ads, apply DRM to the ads (because some platforms cannot play encrypted content followed by unencrypted content), and cache the ads. The stitching component 460 serves the manifest that refers to the freshly transcoded ad pod video segments.

In an embodiment, client electronic devices 400 include a media player application (for example, a media player application 140) capable of playing streaming video (for example, video content in HLS with FairPlay format or DASH with WideVine/CENC format). When the user selects a video to watch, the client electronic device 400 requests a manifest for the selected video (e.g., a streaming manifest file) from the stitching component 460 (and possibly one or more auxiliary manifest files 190). In one embodiment, this request is made over HTTP Secure (HTTPS). If the user is not currently streaming more concurrent streams than they are allowed (for example, as determined by the stitching component 460 or another component of the media delivery system 460), then the stitching component 460 generates a manifest that is specific for the client electronic device 400 and sends the manifest to the client electronic device 400 (e.g., this could include a streaming manifest file 180 and one or more auxiliary manifest files 190). The client electronic device 400 may then begin fetching encrypted video segments from the CDN 475 according to the manifest (the streaming manifest file). In one embodiment, the client electronic device 400 may use timed metadata included in an auxiliary manifest file 190 to provide custom functionality, as described herein. In one embodiment, the encrypted video segments are fetched from the CDN 475 over HTTPS. The content can be fetched from the CDN 475 over a public network such as the internet and thus may travel across a variety of networks.

The media delivery system 460 shown in FIG. 4 may report audience measurement data to Nielsen (or other entities that gather audience measurement data) based on metadata embedded in the video segments. Client electronic devices 400 may have access to a Nielsen Software Development Kit (SDK) library that enables the client electronic devices 400 to report audience measurement data or other software to implement similar functionality.

In one embodiment, the media delivery system 460 shown in FIG. 4 supports the ability to enforce content viewing rules and restrictions according to agreements made with content programmers. For example, these content viewing rules and restrictions may include supporting content blackouts (based on location or device) or content substitutions. In one embodiment, the media delivery system 460 periodically pulls blackout information from programmers (for example, via agreed upon methods and timeframes). Additionally or alternatively, in one embodiment, the video streaming platform allows programmers to push blackout updates to the media delivery system 460 through a cloud-hosted and secure Representational State Transfer (REST) Application Programming Interface (API) (for example, that adheres to SCTE-224). In one embodiment, the video streaming platform can accept blackout information in-band via SCTE-35. In one embodiment, blackout information can include information indicating one or more channels to be blacked out, a zip code to be blacked out, device type(s) to be blacked out, a time period for the blackout, or any combination thereof. The backend of the media delivery system 460 may integrate with a geofencing library that maps client IP addresses to zip codes, which allows the video streaming platform to prevent or stop playback of video content as needed. This process may integrate with the stitching component 460 or another component of the media delivery system 460 so that custom slates can be inserted during blackouts as needed. In one embodiment, blackouts are instead indicated as part of program guide data or other metadata provided to the client electronic device 400, for example, via a separate API, allowing the client electronic device 400 to prevent playback of a blacked-out program It should be understood that the particular division of functionality between the various system components shown in FIG. 4 is purely exemplary and is not intended to be limiting. Functions performed by a single system component may instead be performed by multiple system components and functions performed by multiple system components may instead be performed by a single system component.

An embodiment may be an article of manufacture in which a non-transitory computer-readable medium (such as microelectronic memory) has stored thereon instructions (e.g., computer code) which program one or more data processing components (generically referred to here as a "processor") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While the several embodiments have described, those skilled in the art will recognize that the techniques described herein are not limited to the embodiments described, but can be practiced with modification and alteration within the spirit and scope of the appended claims. The description is thus to be regarded as illustrative instead of limiting.

What is claimed is:

1. An article of manufacture comprising:
a non-transitory machine-readable storage medium that provides instructions that, when executed by a machine, will cause the machine to perform operations comprising:
causing the machine to play video at a current position of a watch party, wherein the current position of the watch party is a time indication of a location within the video at which all participants in the watch party are expected to be playing back the video at a current time, wherein the watch party was created responsive to communications between one of a set of current participants and a centralized system, wherein the centralized system transmits through a content delivery network to each of the set of current participants of the watch party video segment files to playback a video via an adaptive bit rate protocol;
receiving user input indicating the machine should resume playback of a video at an input seek position, wherein the input seek position represents a time indication of a location within the video that is different than the current position of the watch party;
submitting from the machine to the centralized system a request to:
change the current position of the watch party to a reference position at a reference time, wherein the reference position is earlier in the video than the input seek position by a prediction of an amount of time required to download enough of the video segment files of the video to begin playback by the machine; and
communicate the change to the others in the set of current participants to cause them to seek to positions in the video such that the set of current participants will again all be playing back the video at the current position of the watch party at the current time; and
causing the machine to resume playback of the video.

2. The non-transitory machine-readable storage medium of claim 1, wherein the operations further comprise a preliminary operation of submitting from the machine to the centralized system a request to join the watch party as one of the set of one or more current participants.

3. The non-transitory machine-readable storage medium of claim 1, wherein the current times are based on Coordinated Universal Time (UTC).

4. The non-transitory machine-readable storage medium of claim 1, wherein the operations further comprise:
determining a difference between a current Coordinated Universal Time (UTC) time of the machine and a current UTC time of the centralized system exceeds a threshold; and
calculating an estimated clock skew offset used by the machine to determine the reference time.

5. The non-transitory machine-readable storage medium of claim 1, wherein the adaptive bit rate protocol is based on one of: HTTP Live Streaming (HLS), or Dynamic Adaptive Streaming over HTTP (DASH).

6. The non-transitory machine-readable storage medium of claim 1, wherein the centralized system includes an internet streaming video service.

7. The non-transitory machine-readable storage medium of claim 1, wherein the operations further comprise:
receiving user input requesting to send a message to a participant of the watch party; and
sending the message to the participant of the watch party via the centralized system.

8. The non-transitory machine-readable storage medium of claim 1, wherein the operations further comprise:
receiving user input requesting to add an annotation to video; and
sending the annotation to each participant of the watch party via the centralized system.

9. The non-transitory machine-readable storage medium of claim 1, wherein the operations further comprise:
receiving user input indicating the machine should pause playback of the video; and
submitting from the machine to the centralized system a request to pause the current position of the watch party.

10. The non-transitory machine-readable storage medium of claim 1, wherein the video comprises a set of video segment files, and wherein the machine plays the video according to a manifest file describing an order in which the video segment files are to be played.

11. The non-transitory machine-readable storage medium of claim 1, wherein the centralized system maintains playback session state information used to identify a current state and position of the watch party and that is accessible to the set of current participants of the watch party.

12. The non-transitory machine-readable storage medium of claim 1, wherein the current times are based on Coordinated Universal Time (UTC), and wherein the centralized system includes its own current UTC timestamp with update messages sent to participants of the watch party.

13. The non-transitory machine-readable storage medium of claim 1, wherein the operations further comprise a preliminary operation of submitting from the machine to the centralized system a request to initiate a shared playback session of the video, wherein the request identifies the video and a position at which to start playback.

14. The non-transitory machine-readable storage medium of claim 1, wherein the centralized system generates a unique identifier of the watch party and stores the unique identifier in association with playback session state information for the watch party.

15. The non-transitory machine-readable storage medium of claim 1, wherein the request to change the current position of the watch party comprises a shared playback session state update request including a UTC time identifying a current position in the video.

16. The non-transitory machine-readable storage medium of claim 1, wherein the operations further comprise a preliminary operation of submitting from the machine to the centralized system a request to join the watch party as one of the set of current participants, wherein the request includes a unique identifier of the watch party.

17. The non-transitory machine-readable storage medium of claim 1, wherein the prediction of the amount of time required to download enough of the video segment files of the video to begin playback is based at least in part on identified network conditions.

18. The non-transitory machine-readable storage medium of claim 1, wherein the prediction of the amount of time required to download enough of the video segment files of the video to begin playback is based at least in part historical data indicating an amount of time required for previous seeks.

19. The non-transitory machine-readable storage medium of claim 1, wherein the prediction of the amount of time required to download enough of the video segment files of the video to begin playback is based at least in part on a determination of an amount of data to be downloaded for buffering to start playback.

20. The non-transitory machine-readable storage medium of claim 1, wherein an ability to modify the playback of the video is limited to a subset of the participants of the watch party.

* * * * *